United States Patent
Tsukio

(10) Patent No.: US 12,429,009 B2
(45) Date of Patent: Sep. 30, 2025

(54) ELECTRONIC CONTROL DEVICE AND METHOD FOR CONTROLLING ELECTRONIC CONTROL DEVICE

(71) Applicant: Hitachi Astemo, Ltd., Hitachinaka (JP)

(72) Inventor: Koichi Tsukio, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/835,914

(22) PCT Filed: Nov. 10, 2022

(86) PCT No.: PCT/JP2022/041859
§ 371 (c)(1),
(2) Date: Aug. 5, 2024

(87) PCT Pub. No.: WO2023/149045
PCT Pub. Date: Aug. 10, 2023

(65) Prior Publication Data
US 2025/0146451 A1    May 8, 2025

(30) Foreign Application Priority Data
Feb. 7, 2022 (JP) ................. 2022-016801

(51) Int. Cl.
*F02D 41/20*    (2006.01)

(52) U.S. Cl.
CPC ...... *F02D 41/20* (2013.01); *F02D 2041/2003* (2013.01); *F02D 2200/021* (2013.01); *F02D 2200/101* (2013.01)

(58) Field of Classification Search
CPC .............. F02D 41/20; F02D 40/402; F02D 2041/2003; F02D 2041/2006; F02D 2200/101; F02D 2200/021; H02M 3/155
See application file for complete search history.

(56) References Cited

U.S. PATENT DOCUMENTS 10,393,051 B2 * 8/2019 Fukuda ................. F02D 41/20
11,236,693 B2 * 2/2022 Nakajima ............. F02D 41/009
(Continued)

FOREIGN PATENT DOCUMENTS

| JP | 2016-217322 A | 12/2016 | |
| WO | WO-2016125688 A1 * | 8/2016 | ............. F02D 41/20 |
| WO | WO-2017/033643 A1 | 3/2017 | |

OTHER PUBLICATIONS

International Search Report Issued in PCT Application No. PCT/JP2022/041859 dated Jan. 31, 2023, with English Translation.

*Primary Examiner* — Grant Moubry
(74) *Attorney, Agent, or Firm* — Foley & Lardner LLP

(57) ABSTRACT

Provided is an electronic control device that drives and controls a fuel injection valve, the electronic control device increasing a boost current of a booster circuit only in a scene where boosting energy needs to be increased by short-time boosting, and reducing the boost current of the booster circuit in other scenes. The electronic control device including; a booster circuit; a boost setting controller that holds boost control information of the booster circuit; a boost controller that controls an energizing current of the booster circuit based on a current setting value from the boost setting controller; and a fuel injection circuit that supplies current to a fuel injection valve using voltage generated by the booster circuit, in which the boost setting controller reduces a boost speed of the booster circuit when information on engine temperature is higher than a predetermined value.

15 Claims, 7 Drawing Sheets

(56) References Cited

U.S. PATENT DOCUMENTS

| | | | |
|---|---|---|---|
| 11,454,185 B2* | 9/2022 | Shirakawa | F02D 41/20 |
| 2014/0316679 A1* | 10/2014 | Nishida | F02D 41/20 |
| | | | 701/104 |
| 2016/0265469 A1* | 9/2016 | Harada | F02M 51/061 |
| 2018/0230923 A1 | 8/2018 | Tsukio | |

* cited by examiner

ELECTRONIC CONTROL DEVICE AND METHOD FOR CONTROLLING ELECTRONIC CONTROL DEVICE

TECHNICAL FIELD

The present invention relates to a configuration of an electronic control device that drives and controls load and a method for controlling the electronic control device, and particularly relates to a technique that is effective when applied to an in-vehicle electronic control device that requires high reliability.

BACKGROUND ART

From the viewpoint of environmental conservation, it is required to reduce harmful exhaust gases such as CO, HC, and NOx contained in exhaust gases of gasoline vehicles, and regulations have become stricter year by year. Among them, measures for suppressing penetration of fuel injection have been taken, and among them, a multi-stage injection technique is known (there are various patent literatures). It is also known that an effect of the multi-stage injection is more effective in suppressing the exhaust gas by performing the multi-stage injection in a certain number of stages or more at a low engine temperature, and the number of injection stages of the multi-stage injection is increasing year by year.

Since a certain level of energy or more is required to open a fuel injection valve (an injector), a method of boosting battery voltage by a booster circuit is common, but on the other hand, since the multi-stage injection continuously injects fuel within a certain period of time, it is also necessary to increase charging speed by boosting so that energy supply can be made in time for each stage, and thus load on the booster circuit tends to increase year by year.

As a technique for varying boosting charge speed in a fuel injection device (a booster circuit system of the electronic control device), for example, a technique such as that disclosed in PTL 1 is known. In a booster device for driving the injector of PTL 1, when a fuel injection interval is within a certain period, the charge speed is increased by varying a duty ratio of boost control, and fuel injection variation is reduced.

Further, in a fuel control device for an internal combustion engine of PTL 2, by adjusting an upper limit or a lower limit of boost current according to the fuel injection interval, heat generation in the booster circuit is suppressed and life of component parts is extended. By adjusting a value of average boost current with respect to change in the fuel injection interval depending on engine speed, the heat generation in the booster circuit is optimized for each engine speed.

CITATION LIST

Patent Literature

PTL 1: WO 2017/033643 A
PTL 2: JP 2016-217322 A

SUMMARY OF INVENTION

Technical Problem

The technique of PTL 1 focuses on boosting in a short time, and is effective in suppressing the fuel injection variation, however, the load on the booster circuit increases, and in an automobile used for a long period of time, the load on the booster circuit is also naturally extended for a long period of time, and thus there is room for improvement in terms of device life.

In the technique of PTL 2, the injection interval is detected from a rotation angle of the internal combustion engine, and there is room for improvement in coping with a case where the injection interval fluctuates without depending on the engine speed, such as multi-stage injection.

In addition, a protection circuit for preventing boosting energy of the booster circuit from being excessive due to an excessively short injection interval due to detection and a mechanism for measuring a circuit temperature are required, and there is a problem that a circuit scale increases.

Therefore, an object of the present invention is to provide an electronic control device that drives and controls the fuel injection valve, the electronic control device increasing the boost current of the booster circuit only in a scene where the boosting energy needs to be increased by short-time boosting, and reducing the boost current of the booster circuit in other scenes, and a method for controlling the electronic control device.

Solution to Problem

In order to solve the above problem, the present invention includes: a booster circuit; a boost setting controller that holds boost control information of the booster circuit; a boost controller that controls an energizing current of the booster circuit based on a current setting value from the boost setting controller; and a fuel injection circuit that supplies current to a fuel injection valve using voltage generated by the booster circuit, in which the boost setting controller reduces a boost speed of the booster circuit when information on engine temperature is higher than a predetermined value.

In addition, the present invention includes: a step (a) of detecting information on engine temperature and a multi-stage injection command; a step (b) of comparing the information on the engine temperature detected in the step (a) with a predetermined threshold and selecting a boost control current value from a preset current table based on a result of the comparison; a step (c) of detecting an engine rotation signal; a step (d) of determining whether a fuel injection valve is not driven; and a step (e) of setting a current setting value and starting boost control by a booster circuit based on the current setting value set when it is determined in the step (d) that the fuel injection valve is not driven.

Advantageous Effects of Invention

According to the present invention, it is possible to extend life of the electronic control device.

Problems, configurations, and effects other than those described above will be clarified by the following description of embodiments.

DESCRIPTION OF EMBODIMENTS

Hereinafter, embodiments of the present invention will be described with reference to the drawings.

First Embodiment

A fuel injection valve control device and a method for controlling the fuel injection valve control device according to a first embodiment of the present invention will be described with reference to FIGS. 1 to 4 and 7.

Figure 1:
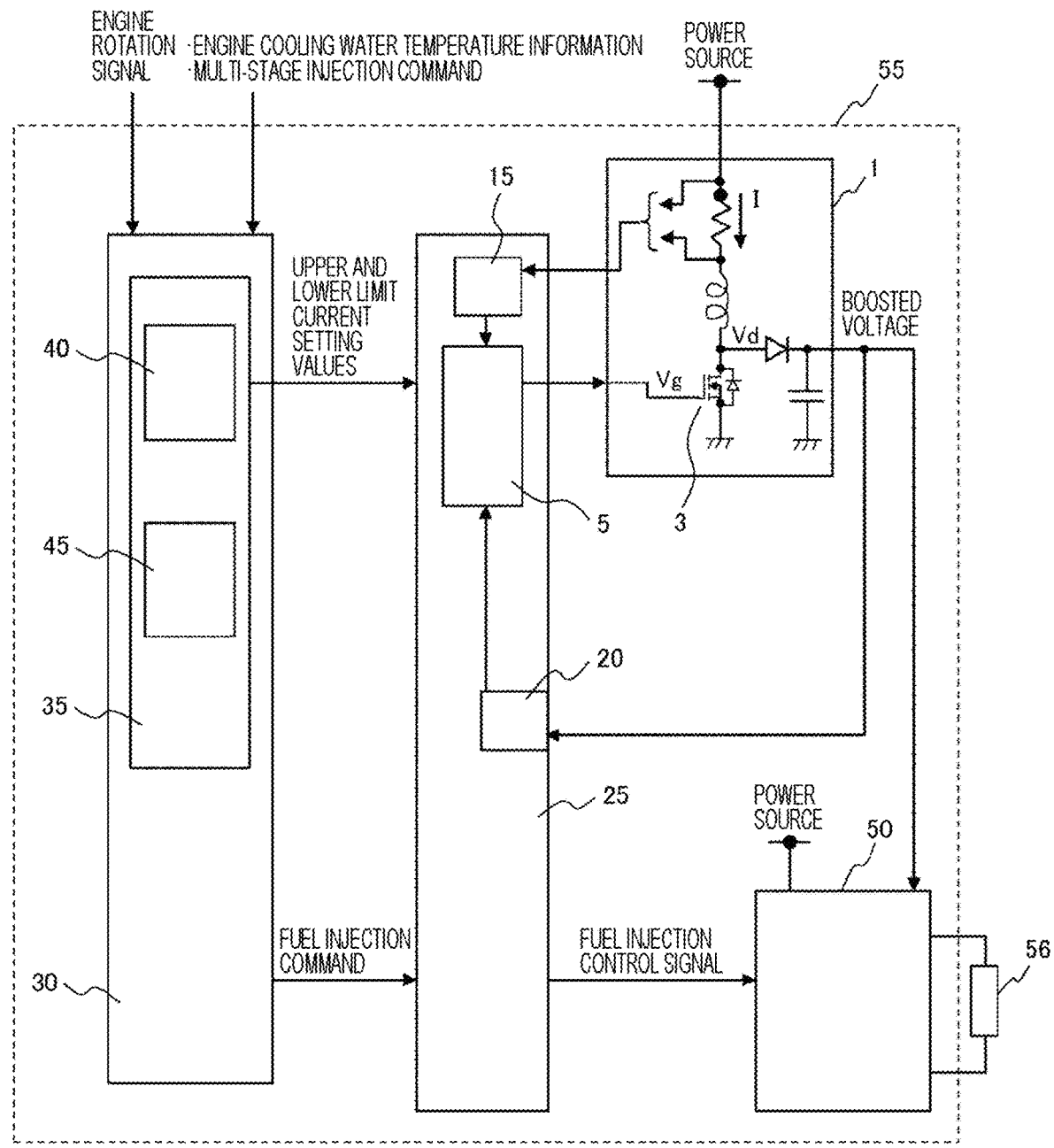
FIG. 1 is a functional block diagram of a fuel injection valve control device according to a first embodiment of the present invention.
Figure 2:
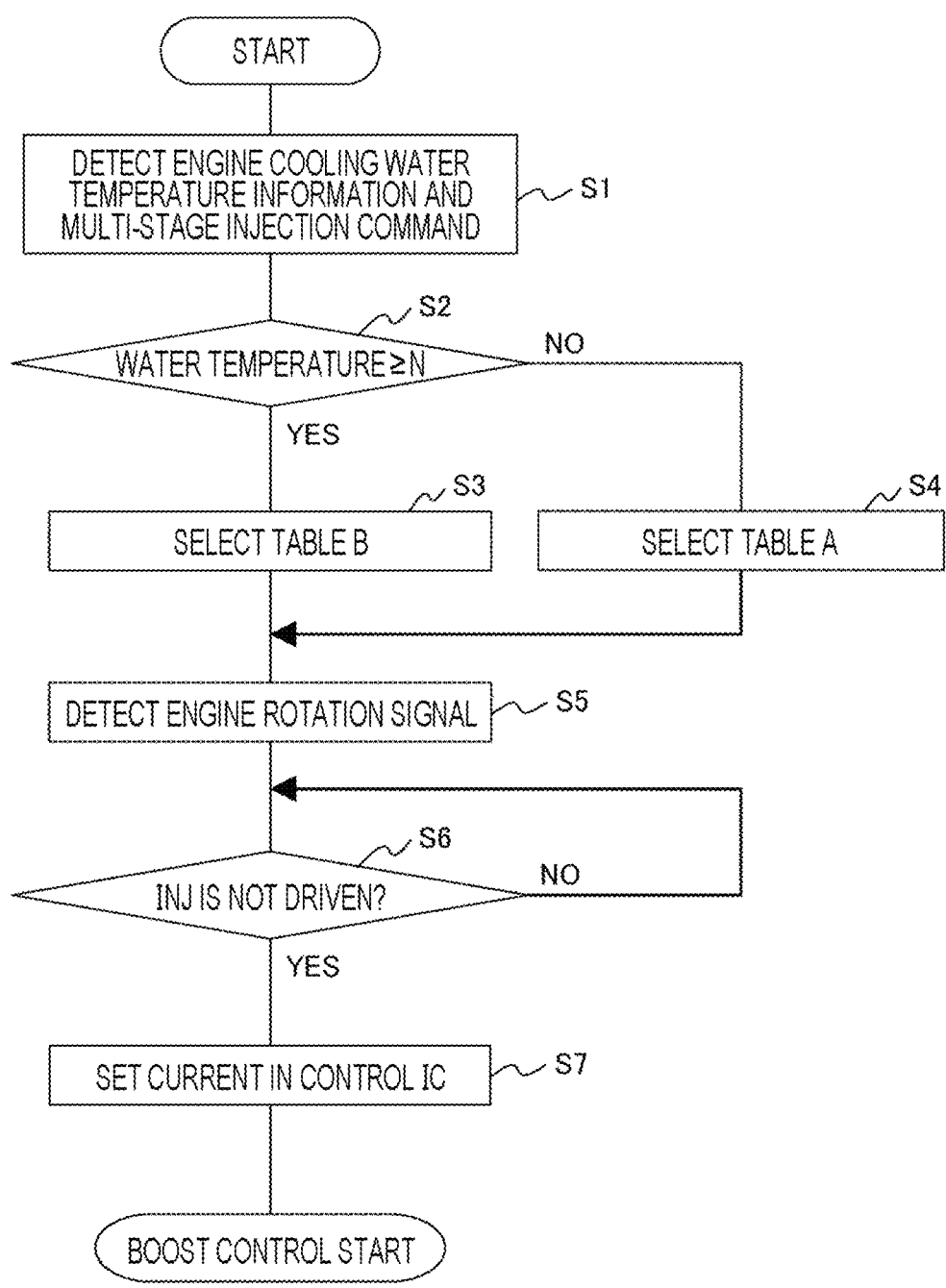
FIG. 2 is a flowchart illustrating a method for controlling the fuel injection valve control device of FIG. 1.
Figure 3:
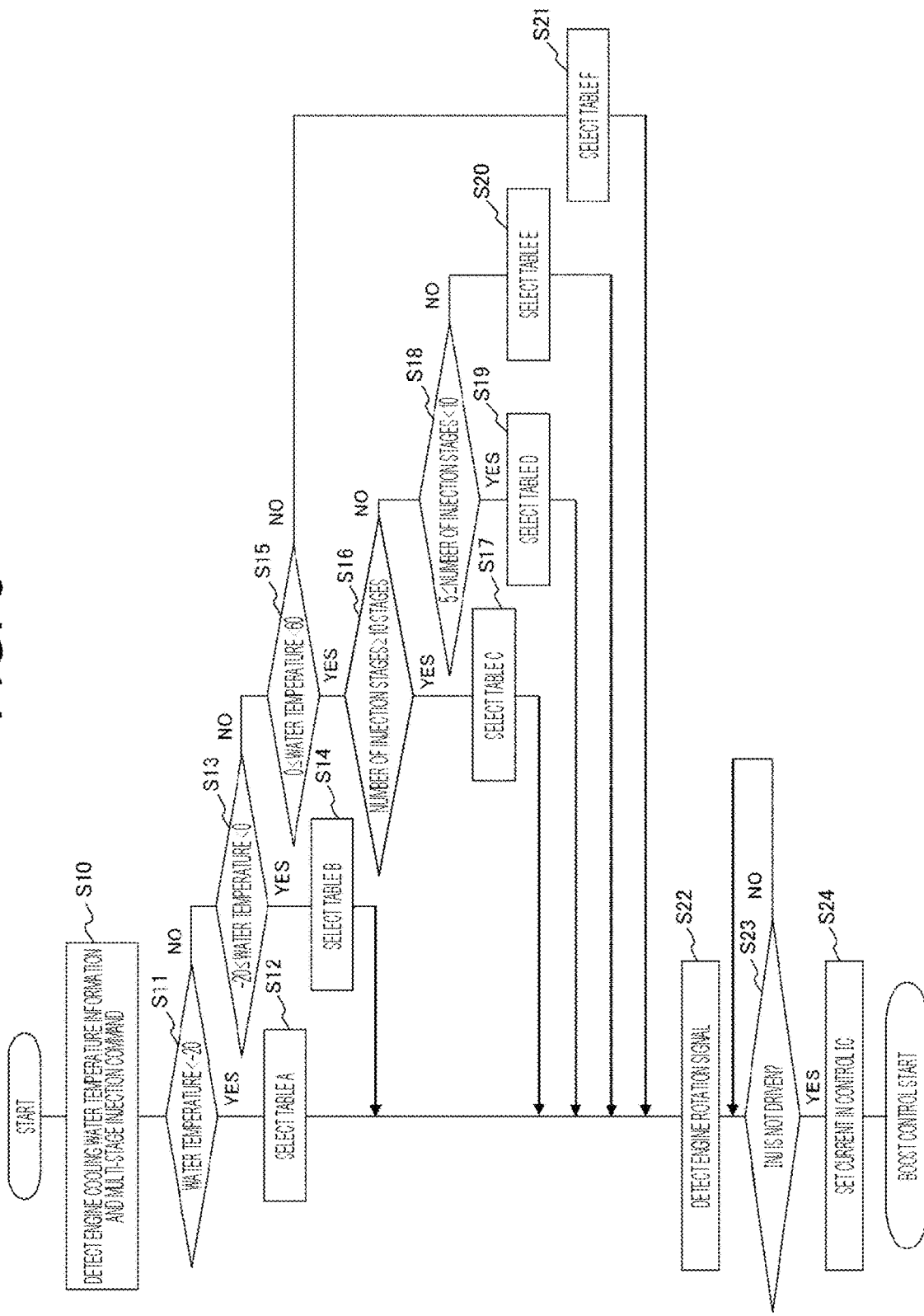
FIG. 3 is a flowchart illustrating the method for controlling the fuel injection valve control device of FIG. 1.
Figure 4:
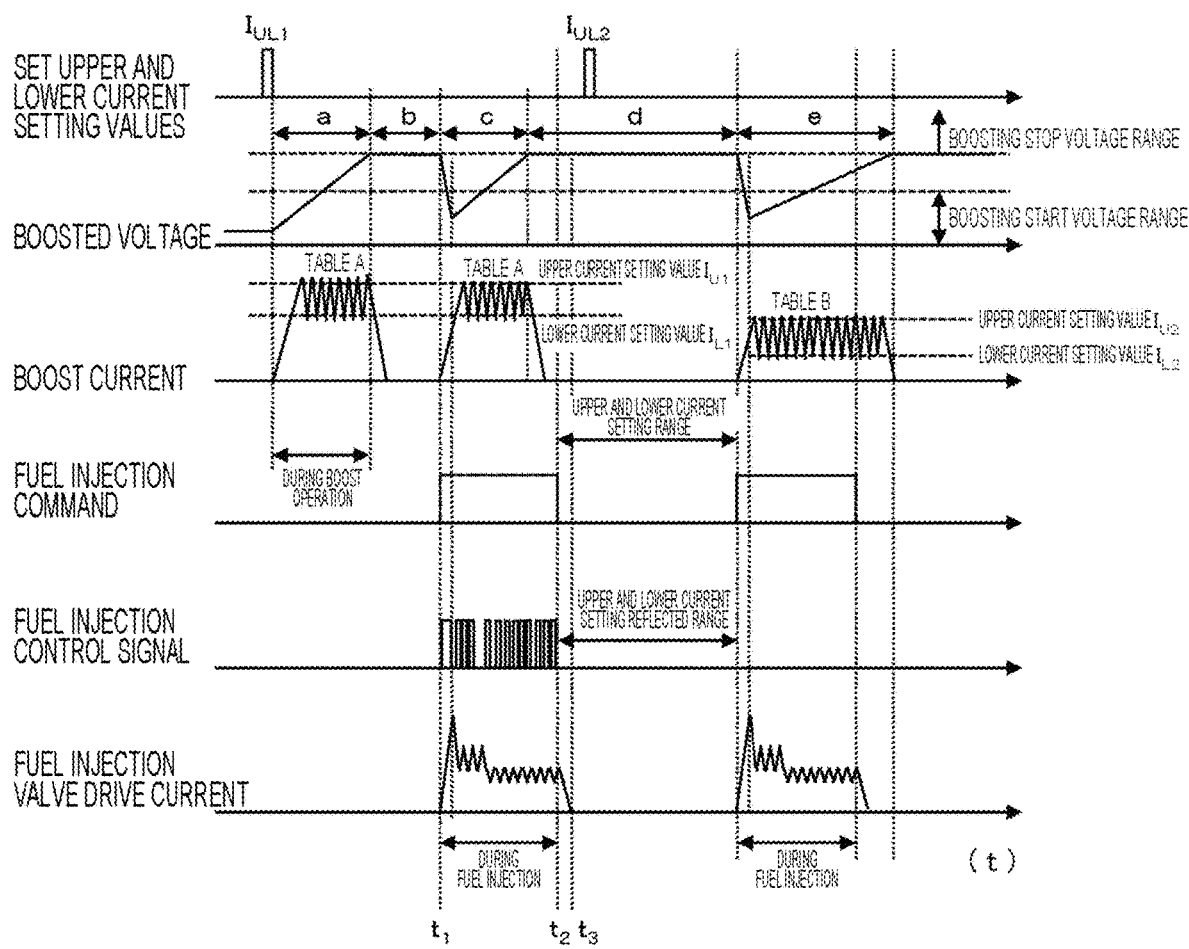
FIG. 4 is a timing chart illustrating an operation example of the fuel injection valve control device of FIG. 1.
Figure 7:
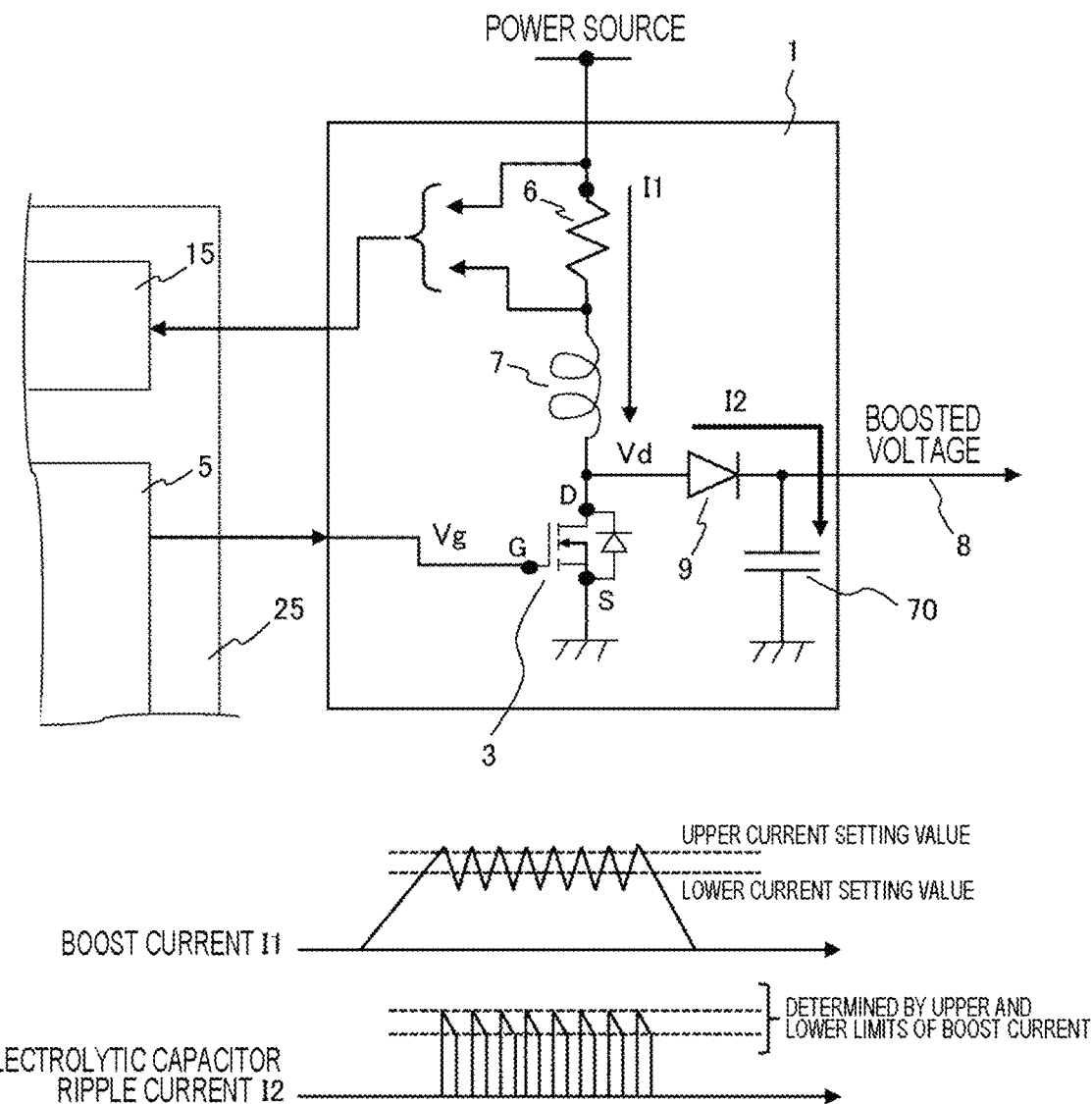
FIG. 7 is a diagram illustrating a configuration example of a booster circuit 1 of FIG. 1 and current values thereof.

FIG. 1 is a functional block diagram of a fuel injection valve control device 55 of the present embodiment. FIGS. 2 and 3 are flowcharts illustrating the method for controlling the fuel injection valve control device 55 of FIG. 1. FIG. 4 is a timing chart illustrating an operation example of the fuel injection valve control device 55 of FIG. 1. FIG. 7 is a diagram illustrating a configuration example of a booster circuit 1 of FIG. 1 and current values thereof.

First, a configuration of the fuel injection valve control device (electronic control device) according to the first embodiment of the present invention will be described with reference to FIGS. 1 and 7.

As illustrated in FIG. 1, the fuel injection valve control device 55 of the present embodiment includes the booster circuit 1, a fuel injection control IC 25, an arithmetic device 30, and a fuel injection circuit 50 as main components.

As illustrated in FIG. 7, the booster circuit 1 includes a resistor 6, a reactor 7, and a boost driver 3 connected in series between a power source such as a battery and ground, and an output line 8 that outputs a boosted voltage is connected between the reactor 7 and the boost driver 3. A diode 9 for preventing backflow of current and a smoothing capacitor 70 are connected to the output line 8.

For example, a power metal oxide semiconductor field effect transistor (MOSFET) is used as the boost driver 3. FIG. 7 illustrates an example of a power MOSFET including an n-channel enhanced MOSFET and a body diode (antiparallel diode), in which a drain terminal D of the power MOSFET is connected to the power source side, and a source terminal S is connected to the ground side.

The current flowing through the resistor 6 is detected by a current monitor 15 of the fuel injection control IC 25, and gate voltage Vg output from a boost controller 5 of the fuel injection control IC 25 based on the detected current value is input to the boost driver 3. The boost driver 3 is on/off controlled on the basis of the input gate voltage Vg and controls timing of outputting the boosted voltage from the booster circuit 1. Drain voltage Vd of the boost driver 3 is the boosted voltage.

As the smoothing capacitor 70, an electrolytic capacitor is used from the viewpoint of withstand voltage.

In the booster circuit 1, when boost current I1 is increased, ripple current I2 of the electrolytic capacitor flowing through the smoothing capacitor (electrolytic capacitor) 70 at a subsequent stage of the circuit also increases as a result.

When increasing the current as described above, average current may be used or effective current may be used.

By boosting battery voltage by the booster circuit 1 and supplying it to the fuel injection circuit 50, multi-stage injection by a fuel injection valve (an injector) 56 connected to the fuel injection valve control device 55 can be performed.

As a characteristic of the electrolytic capacitor, a filling residual amount of an electrolytic solution is generally directly linked to a life, but since the electrolytic capacitor has a larger loss than other capacitors, the ripple current I2 increases, thereby increasing self-heating, promoting transpiration of the electrolytic solution, and significantly decreasing the life.

When the voltage supplied from the power source to the booster circuit 1 is constant, it is necessary to increase the boost current I1 in order to increase a boost speed. On the other hand, when the boost current I1 is increased, the ripple current I2 of the electrolytic capacitor is also increased, and the life of the electrolytic capacitor is shortened.

Therefore, the fuel injection valve control device 55 of the present embodiment controls such that the boost current of the booster circuit 1 is increased only in a scene where the boosting energy needs to be increased by short-time boosting, and the boost current of the booster circuit 1 is reduced in other scenes.

That is, when it is necessary to rapidly raise a drive voltage of the fuel injection valve 56 in order to realize stable multi-stage injection, a current setting value of the booster circuit 1 is increased, and when it is not necessary to rapidly raise the drive voltage of the fuel injection valve 56, the current setting value of the booster circuit 1 is decreased in order to reduce load on the electrolytic capacitor.

In a gasoline automobile, a temperature of an engine is low, for example, immediately after the engine starts or immediately after start of traveling in a cold area. At a low engine temperature, fuel is not sufficiently burned out, and energy of combustion is insufficient. In such a case, the current setting value of the booster circuit 1 is increased.

Thus, it is possible to suppress a driving time in a high-load short-time boosting scene in an accumulated driving time of the booster circuit 1 in a vehicle by limiting a short-time boosting scene requiring large boosting energy that is a high load for the booster circuit 1 to only when the engine is at a low temperature and reducing the boosting energy under other conditions, and as a result, it is possible to suppress deterioration of the smoothing capacitor (electrolytic capacitor) 70 of the booster circuit 1 and the fuel injection valve control device 55 equipped with the smoothing capacitor.

A configuration of the fuel injection valve control device 55 for performing the above control will be described in detail.

The fuel injection control IC 25 includes the boost controller 5, the current monitor 15, and a voltage monitor 20.

The arithmetic device 30 includes a boost setting controller 35, a current table selector 40, and a current table 45.

The fuel injection valve (injector) 56 for gasoline is connected to the fuel injection circuit 50, and controls a valve opening timing of the fuel injection valve 56. Note that as valve opening energy of the fuel injection valve 56, the boosted voltage generated by the booster circuit 1 and power source voltage are used.

When upper and lower limit current setting values of boost control are set from the arithmetic device 30 to the fuel injection control IC 25, the boost controller 5 measures the boosted voltage by the voltage monitor 20 that measures the boosted voltage, and when the boosted voltage is equal to or less than a predetermined voltage, the boost controller 5 controls the boost driver 3 to start boost operation.

During boosting, circuit current I flowing through the booster circuit 1 is measured by the current monitor 15, and the boost controller 5 performs PWM control on the boost driver 3 so that a measured current value by the current monitor 15 is similar to upper and lower current setting values.

The voltage monitor 20 measures the boosted voltage stored by the PWM control by the boost controller 5, and when the boosted voltage reaches the predetermined voltage, the boost controller 5 stops the boost operation.

Note that an upper current setting value $I_U$ ($I_{U1}$ and $I_{U2}$ in FIG. 4) and a lower current setting value $I_L$ ($I_{L1}$, $I_{L2}$ in FIG. 4) set from the arithmetic device 30 to the fuel injection control IC 25 are selected from the current table 45 by the current table selector 40.

In addition to boosting the power source voltage of the booster circuit 1, the fuel injection control IC 25 receives a fuel injection command generated by the arithmetic device 30 that has received an engine rotation signal, and outputs a fuel injection control signal to the fuel injection circuit 50. The fuel injection circuit 50 performs fuel injection by driving the fuel injection valve 56 based on the fuel injection control signal.

The method for controlling the fuel injection valve control device 55 of the present embodiment will be described with reference to FIGS. 2 to 4.

FIG. 2 illustrates a representative operation flow of the fuel injection valve control device 55 of the present embodiment.

When operation of the fuel injection valve control device 55 is started, the arithmetic device 30 receives engine cooling water temperature information and a multi-stage injection command from the vehicle. (Step S1) In the present embodiment, the engine cooling water temperature information is substituted for the engine temperature, however, as long as the information allows the engine temperature to be recognized, it is not limited to the engine cooling water temperature information, and other information can also be substituted. Examples of the other information include information directly indicating the engine temperature itself such as temperature of a combustion chamber, and temperature information of the fuel.

The current table selector 40 in the arithmetic device 30 that has received the engine cooling water temperature information determines whether the engine cooling water temperature is equal to or higher than a threshold N. (Step S2) If the engine cooling water temperature is equal to or higher than the threshold N (Yes), a table B is selected from the current table 45 (Step S3), and if it is less than the threshold N (No), a table A is selected (Step S4).

A relationship between current setting values in Table A and Table B is that current in Table B<current in Table A, and the current setting value in Table B is lower than that in Table A. The average current may be used as the current setting value. Alternatively, the effective current may be used.

After the current table selector 40 selects the current table, the arithmetic device 30 receives the engine rotation signal from the vehicle. (Step S5) The arithmetic device 30 that has received the engine rotation signal determines whether the fuel injection valve (injector: INJ) 56 is not driven. (Step S6) If it is determined that the fuel injection valve (INJ) 56 is not driven (Yes), in a period in which the arithmetic device 30 does not output the fuel injection command to the fuel injection control IC 25, the upper and lower current setting values are set in the fuel injection control IC 25 based on the multi-stage injection command and the engine rotation signal obtained from the vehicle (Step S7), and the boost control by the booster circuit 1 is started.

On the other hand, if it is determined that the fuel injection valve (INJ) 56 is driven (No), determination operation of Step S6 is repeated until it is determined that the fuel injection valve (INJ) 56 is not driven.

Thus, the upper and lower current setting values can be reflected in the fuel injection control IC 25 while avoiding that a boost current value is changed during opening of the fuel injection valve 56, the boosted voltage fluctuates, and the fuel injection is affected.

FIG. 3 illustrates another operation flow of the fuel injection valve control device 55 of the present embodiment.

In FIG. 2, the current table 45 has two types of A and B, but in a case where there is a plurality of temperature thresholds, it is also assumed that the current table is set according to the plurality of thresholds. In this case, the average current and the effective current are lower in the current table paired with the threshold of high temperature than in the current table paired with the threshold of low temperature.

In addition, it is also assumed that a plurality of current tables are set according to the number of stages depending on the number of multi-stage stages. In this case, as the number of stages increases, the average current and the effective current in the current table are higher.

FIG. 3 illustrates an example of three types of temperature thresholds of −20° C., 0° C., and 60° C., and two types of multi-stage injection stages of 5 stages and 10 stages.

When operation of the fuel injection valve control device 55 is started, the arithmetic device 30 receives engine cooling water temperature information and a multi-stage injection command from the vehicle. (Step S10)

The current table selector 40 in the arithmetic device 30 that has received the engine cooling water temperature information determines whether the engine cooling water temperature is lower than −20° C. (Step S11)

If the engine cooling water temperature is lower than −20° C. (Yes), the table A is selected from the current table 45 (Step S12), and if the engine cooling water temperature is −20° C. or higher (No), it is further determined whether the engine cooling water temperature is lower than 0° C. (Step S13)

If it is determined in Step S13 that the engine cooling water temperature is −20° C. or higher and lower than 0° C. (Yes), the table B is selected (Step S14), and if it is 0° C. or higher (No), it is further determined whether the engine cooling water temperature is lower than 60° C. (Step S15)

If it is determined in Step S15 that the engine cooling water temperature is 0° C. or higher and lower than 60° C. (Yes), it is further determined whether the number of stages of the multi-stage injection command is 10 stages or higher. (Step S16)

If it is determined in Step S16 that the number of stages of the multi-stage injection command is 10 stages or more (Yes), a table C is selected (Step S17), and if it is less than 10 stages (No), it is further determined whether the number of stages of the multi-stage injection command is 5 stages or more and less than 10 stages. (Step S18)

If it is determined in Step S18 that the number of stages of the multi-stage injection command is 5 stages or more and less than 10 stages (Yes), a table D is selected (Step S19), and if it is determined that the number of stages is less than 5 stages (No), a table E is selected. (Step S20)

If it is determined in Step S15 that the engine cooling water temperature is 60° C. or higher (No), a table F is selected. (Step S21)

A relationship among the current setting values in Table A, Table B, Table C, Table D, Table E, and Table F is that current in Table F<current in Table E<current in Table D<current in Table C<current in Table B<current in Table A. The average current may be used as the current setting value. Alternatively, the effective current may be used.

After the current table selector 40 selects the current table, the arithmetic device 30 receives the engine rotation signal from the vehicle. (Step S22)

The arithmetic device 30 that has received the engine rotation signal determines whether the fuel injection valve (injector: INJ) 56 is not driven. (Step S23)

If it is determined that the fuel injection valve (INJ) 56 is not driven (Yes), in the period in which the arithmetic device 30 does not output the fuel injection command to the fuel injection control IC 25, the upper and lower current setting values are set in the fuel injection control IC 25 based on the multi-stage injection command and the engine rotation signal obtained from the vehicle (Step S24), and the boost control by the booster circuit 1 is started.

On the other hand, if it is determined that the fuel injection valve (INJ) 56 is driven (No), determination operation of Step S23 is repeated until it is determined that the fuel injection valve (INJ) 56 is not driven.

The operation example of the fuel injection valve control device 55 of the present embodiment will be described with reference to FIG. 4. FIG. 4 is a timing chart of the boost control using two types of tables A and B described in FIG. 2.

When the upper and lower current setting values $I_{UL1}$ are set from the arithmetic device 30 to the fuel injection control IC 25, the boost operation is performed according to the table A selected based on the engine cooling water temperature information, and the voltage value and the current value of the booster circuit 1 increase. The current value of the booster circuit 1 is controlled between the upper current setting value $I_{U1}$ and the lower current setting value $I_{L1}$ in the table A (period a).

When the boosted voltage of the booster circuit 1 reaches a boosting stop voltage range, the boost current is stopped.

The boosted voltage of the booster circuit 1 decreases after holding boosting stop voltage for a certain period (period b). During this period (period b), the multi-stage injection command is not input to the arithmetic device 30, and the fuel injection command is not output from the arithmetic device 30 to the fuel injection control IC 25, and thus the fuel injection control signal is not output from the fuel injection control IC 25 to the fuel injection circuit 50, and a fuel injection valve drive current is not output from the fuel injection valve control device 55 to the fuel injection valve 56.

When the multi-stage injection command is input to the arithmetic device 30 at time $t_1$, the boost operation is performed again according to the table A selected based on the engine cooling water temperature information, and the voltage value and the current value of the booster circuit 1 increase. The current value of the booster circuit 1 is controlled between the upper current setting value $I_{U1}$ and the lower current setting value $I_{L1}$ in the table A (period c).

In the period c, since the engine cooling water temperature is less than the threshold N, the table A is selected, and the multi-stage injection command is input to the arithmetic device 30 at time $t_1$, and thus, the fuel injection command is output from the arithmetic device 30 to the fuel injection control IC 25, the fuel injection control signal is also output from the fuel injection control IC 25 to the fuel injection circuit 50, the fuel injection valve drive current is also output from the fuel injection valve control device 55 to the fuel injection valve 56, and the multi-stage injection is performed.

When the boosted voltage of the booster circuit 1 reaches a boosting stop voltage range, the boost current is stopped.

When an input of the multi-stage injection command to the arithmetic device 30 is stopped at time $t_2$, an output of the fuel injection command from the arithmetic device 30 to the fuel injection control IC 25 is stopped, an output of the fuel injection control signal from the fuel injection control IC 25 to the fuel injection circuit 50 is also stopped, the fuel injection valve drive current from the fuel injection valve control device 55 to the fuel injection valve 56 is also stopped, and the multi-stage injection is stopped.

In a period d, the boosted voltage of the booster circuit 1 is maintained at the boosting stop voltage. In the period d, the upper and lower current setting values $I_{UL2}$ of the boost control are set again from the arithmetic device 30 to the fuel injection control IC 25. At this time, since the multi-stage injection command is not input to the arithmetic device 30, the upper and lower current setting values $I_{UL2}$ are reflected in the fuel injection control IC 25 while avoiding that the boost current value is changed during opening of the fuel injection valve 56, the boosted voltage fluctuates, and the fuel injection is affected.

In a period e, the engine cooling water temperature is equal to or higher than the threshold N, the table B is selected, and the boost operation is performed according to the table B. The current value of the booster circuit 1 is controlled between the upper current setting value $I_{U2}$ and the lower current setting value $I_{L2}$ in the table B.

In the period e, for example, the multi-stage injection command with a small number of stages is input to the arithmetic device 30, the fuel injection command is output from the arithmetic device 30 to the fuel injection control IC 25, the fuel injection control signal is also output from the fuel injection control IC 25 to the fuel injection circuit 50, the fuel injection valve drive current is also output from the fuel injection valve control device 55 to the fuel injection valve 56, and the multi-stage injection with a small number of stages is performed.

In the table B, the average current and the effective current for performing the multi-stage injection with a smaller number of stages than those in the table A are set, and a boost speed by the booster circuit 1 is smaller (slower) than that in the table A.

As described above, the fuel injection valve control device 55 of the present embodiment includes the booster circuit 1, the boost setting controller 35 that holds boost control information of the booster circuit 1, the boost controller 5 that controls an energizing current of the booster circuit 1 based on the current setting value from the boost setting controller 35, and the fuel injection circuit 50 that supplies current to the fuel injection valve using the voltage generated by the booster circuit 1, and when it is not necessary to rapidly raise the drive voltage of the fuel injection valve 56, that is, when information on the engine temperature (for example, the engine cooling water temperature information) is higher than a predetermined value, or when the number of multi-stage injections is small, the boost setting controller 35 changes the current setting value so that the boost speed of the booster circuit 1 decreases in order to reduce the load on the smoothing capacitor (electrolytic capacitor) 70.

Thus, it is possible to suppress the driving time in the high-load short-time boosting scene in the accumulated driving time of the booster circuit 1 in the vehicle by limiting the short-time boosting scene requiring large boosting energy that is the high load for the booster circuit 1 to only when the engine is at a low temperature or when the number of multi-stage injections is large, that is, when the short-time boosting is truly required, and as a result, it is possible to suppress deterioration of the smoothing capacitor (electrolytic capacitor) 70 of the booster circuit 1 and the fuel injection valve control device 55 equipped with the smoothing capacitor.

Since the technique of PTL 1 is intended to reduce fuel injection variations caused by a short injection interval and a delay in boost charging time, it is assumed that a mechanism for detecting the injection interval is used, and it is necessary to process detected injection interval information, and thus load on the arithmetic device such as a central processing unit (CPU) or a microcomputer in the fuel injection device is large.

In addition, since there is a case where boosting is not necessarily required in a short time depending on a state of the engine such at the time of acceleration, deceleration, engine start, or idling, varying the boosting energy only by an injection interval may lead to an unnecessary increase in load on the booster circuit.

The technique of PTL 2 focuses on boosting in a short time with respect to shortening of the injection interval, and similarly to PTL 1, the mechanism for detecting the injection interval is required, and the load on the arithmetic device in the fuel injection device is large.

In the present embodiment, a boost control current value is selected from a preset current table based on the engine cooling water temperature information and the multi-stage injection command, and the current value of the boost control is set in the fuel injection control IC 25, so that the load on the arithmetic device such as the CPU or the microcomputer can be suppressed.

Furthermore, the boost current of the booster circuit 1 is increased only in a scene where the boosting energy needs to be increased by short-time boosting, such as when the engine is at a low temperature or when the number of multi-stage injections is large, and the boost current of the booster circuit 1 is reduced in other scenes, so that the load on the booster circuit 1 can be suppressed.

Second Embodiment

The fuel injection valve control device and the method for controlling the fuel injection valve control device according to a second embodiment of the present invention will be described with reference to FIGS. 5 and 6.

Figure 5:
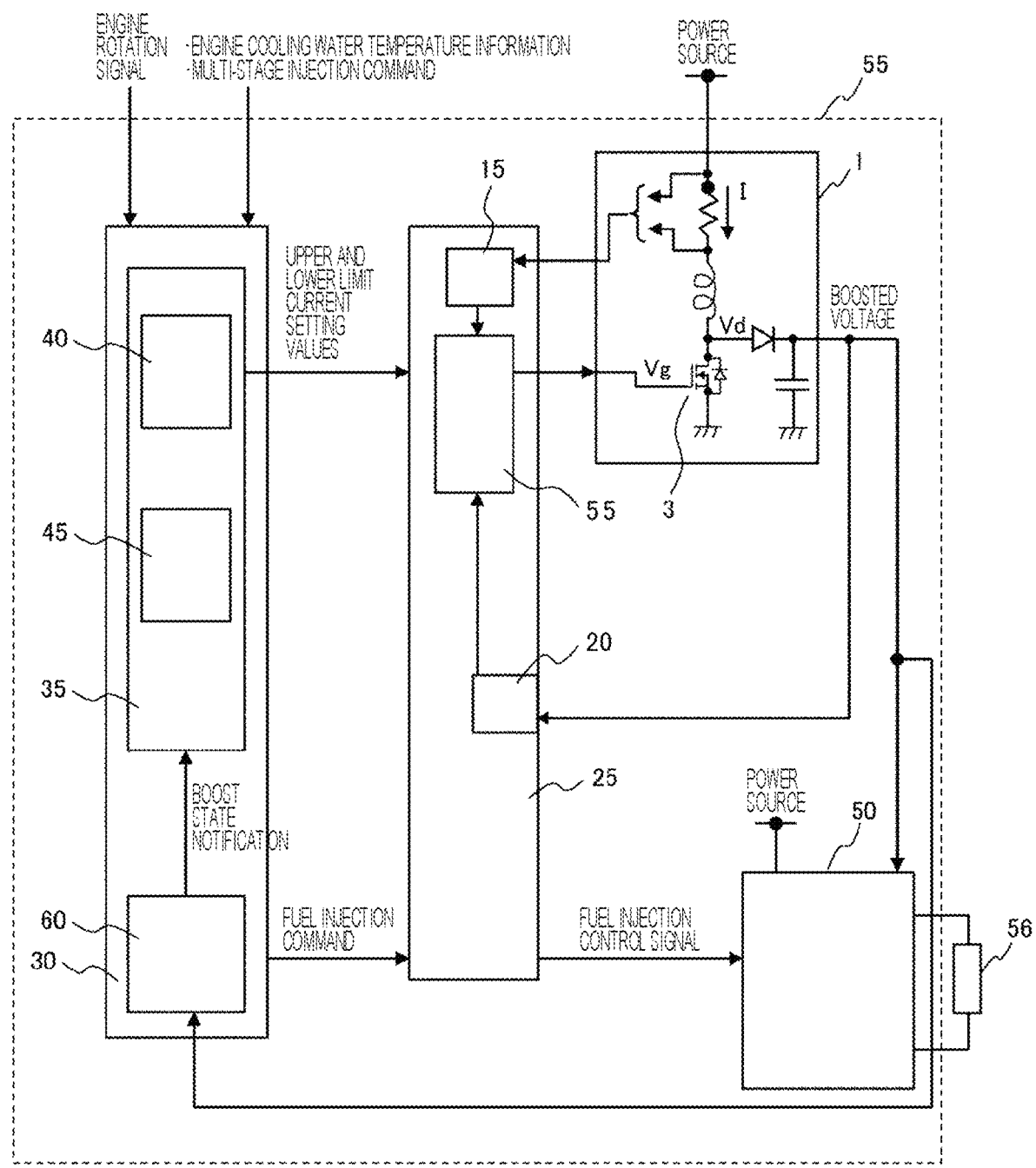
FIG. 5 is a functional block diagram of the fuel injection valve control device according to a second embodiment of the present invention.

FIG. 5 is a functional block diagram of the fuel injection valve control device 55 of the present embodiment. FIG. 6 is a timing chart illustrating an operation example of the fuel injection valve control device 55 of FIG. 5.

The fuel injection valve control device 55 of the present embodiment is different from the fuel injection valve control device 55 of the first embodiment (FIG. 1) in that the arithmetic device 30 includes a boost voltage monitor 60. Other configurations are similar to those of the first embodiment (FIG. 1).

The boost voltage monitor 60 is a circuit that monitors the boosted voltage to determine whether the boost operation is being performed.

A boost state determined by the boost voltage monitor 60 is immediately notified to the boost setting controller 35, and the boost setting controller 35 sets upper and lower limit currents in the fuel injection control IC 25 at a timing when the boosting by the booster circuit 1 is not performed based on the notified boost state.

According to the fuel injection valve control device 55 of the present embodiment, by reliably avoiding current setting during boosting, it is possible to avoid an error in upper and lower limit current setting to the fuel injection control IC 25 due to boosting noise.

Note that in the present embodiment, it is configured such that the boosted voltage is directly taken into the arithmetic device 30, but a configuration in which the boosted voltage is divided or stepped down to a voltage that can be taken into the arithmetic device 30 before being input to the arithmetic device 30 is assumed. Further, a method of monitoring the boost state is realized by directly monitoring the boosted voltage, but a method of directly transmitting a boost control state from the fuel injection control IC 25 to the arithmetic device 30 may be used.

The operation example of the fuel injection valve control device 55 of the present embodiment will be described with reference to FIG. 6. Similarly to FIG. 4, FIG. 6 is a timing chart of the boost control using the two types of tables A and B described in FIG. 2.

When the upper and lower current setting values $I_{UL1}$ are set from the arithmetic device 30 to the fuel injection control IC 25, the boost operation is performed according to the table A selected based on the engine cooling water temperature information, and the voltage value and the current value of the booster circuit 1 increase. The current value of the booster circuit 1 is controlled between the upper current setting value $I_{U1}$ and the lower current setting value $I_{L1}$ in the table A (period a).

When the boosted voltage of the booster circuit 1 reaches a boosting stop voltage range, the boost current is stopped.

The boosted voltage of the booster circuit 1 decreases after holding boosting stop voltage for a certain period (period b). During this period (period b), the multi-stage injection command is not input to the arithmetic device 30, and the fuel injection command is not output from the arithmetic device 30 to the fuel injection control IC 25, and thus the fuel injection control signal is not output from the fuel injection control IC 25 to the fuel injection circuit 50, and a fuel injection valve drive current is not output from the fuel injection valve control device 55 to the fuel injection valve 56.

When the multi-stage injection command is input to the arithmetic device 30 at time $t_1$, the boost operation is performed again according to the table A selected based on the engine cooling water temperature information, and the voltage value and the current value of the booster circuit 1 increase. The current value of the booster circuit 1 is controlled between the upper current setting value $I_{U1}$ and the lower current setting value $I_{L1}$ in the table A (period c).

In the period c, since the engine cooling water temperature is less than the threshold N, the table A is selected, and the multi-stage injection command is input to the arithmetic device 30 at time $t_1$, and thus, the fuel injection command is output from the arithmetic device 30 to the fuel injection control IC 25, the fuel injection control signal is also output from the fuel injection control IC 25 to the fuel injection circuit 50, the fuel injection valve drive current is also output from the fuel injection valve control device 55 to the fuel injection valve 56, and the multi-stage injection is performed. (Period $c_1$)

When an input of the multi-stage injection command to the arithmetic device 30 is stopped at time $t_2$, an output of the fuel injection command from the arithmetic device 30 to the fuel injection control IC 25 is stopped, an output of the fuel injection control signal from the fuel injection control IC 25 to the fuel injection circuit 50 is also stopped, the fuel injection valve drive current from the fuel injection valve control device 55 to the fuel injection valve 56 is also stopped, and the multi-stage injection is stopped. (Period $c_2$)

In the period $c_2$, the upper and lower current setting values $I_{U2}$ of the boost control are set again from the arithmetic device 30 to the fuel injection control IC 25. At this time, since the multi-stage injection command is not input to the arithmetic device 30, the upper and lower current setting values $I_{UL2}$ are reflected in the fuel injection control IC 25 while avoiding that the boost current value is changed during opening of the fuel injection valve 56, the boosted voltage fluctuates, and the fuel injection is affected.

In the period $c_2$, when the boosted voltage of the booster circuit 1 reaches the boosting stop voltage range, the boost current is stopped.

In a period d, the boosted voltage of the booster circuit 1 is maintained at the boosting stop voltage.

In a period e, the engine cooling water temperature is equal to or higher than the threshold N, the table B is selected, and the boost operation is performed according to the table B. The current value of the booster circuit 1 is controlled between the upper current setting value $I_{U2}$ and the lower current setting value $I_{L2}$ in the table B.

In the period e, for example, the multi-stage injection command with a small number of stages is input to the arithmetic device 30, the fuel injection command is output from the arithmetic device 30 to the fuel injection control IC 25, the fuel injection control signal is also output from the fuel injection control IC 25 to the fuel injection circuit 50, the fuel injection valve drive current is also output from the fuel injection valve control device 55 to the fuel injection valve 56, and the multi-stage injection with a small number of stages is performed.

In the table B, the average current and the effective current for performing the multi-stage injection with a smaller number of stages than those in the table A are set, and a boost speed by the booster circuit 1 is smaller (slower) than that in the table A.

Figure 6:
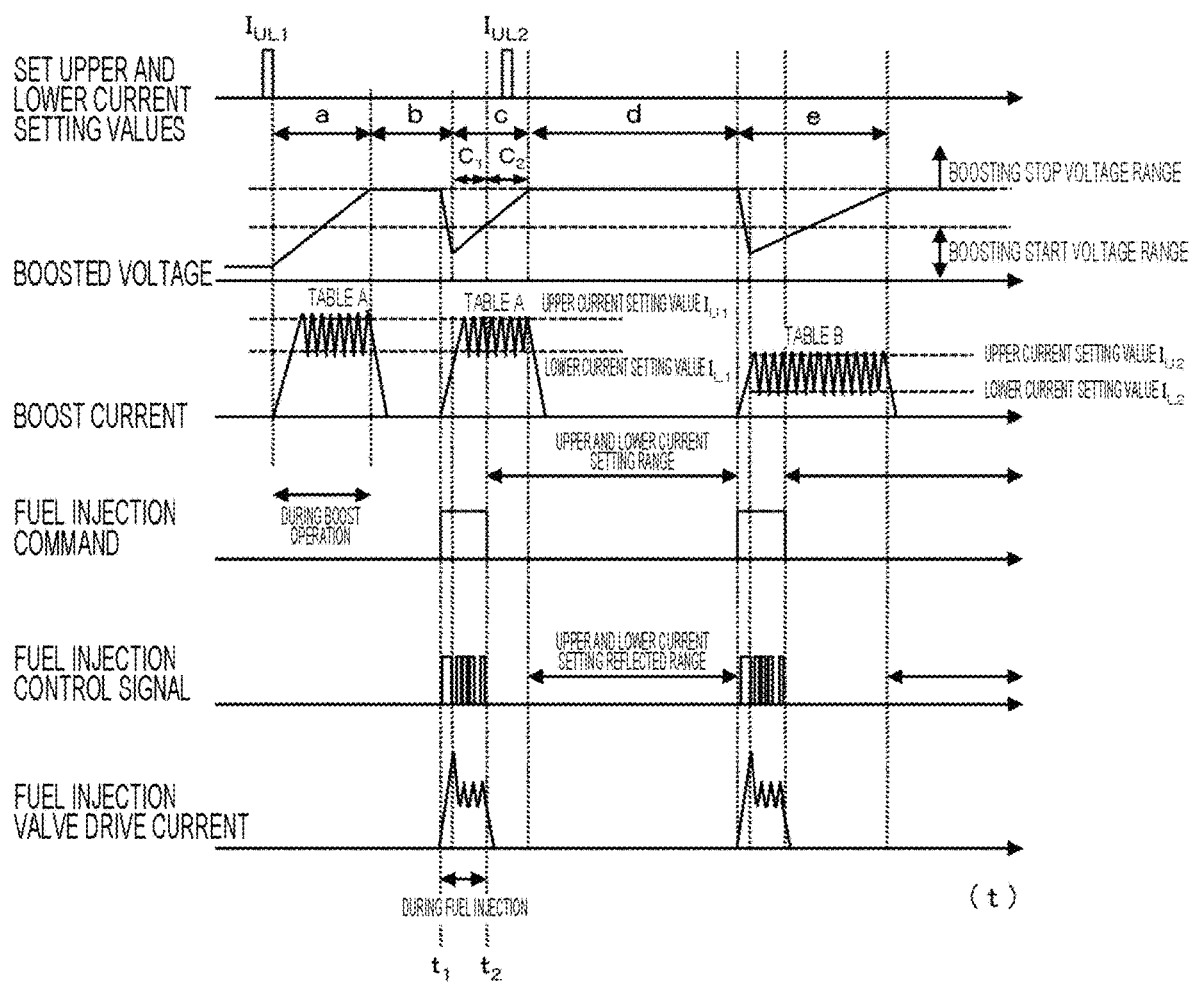
FIG. 6 is a timing chart illustrating an operation example of the fuel injection valve control device of FIG. 5.

Note that as illustrated in the period $c_2$ of FIG. 6, even when the boost voltage monitor 60 determines that the boost operation is being performed, when the input of the multi-stage injection command to the arithmetic device 30 is stopped, the boost setting controller 35 can determine that it is a timing when the upper and lower currents can be set, and can set the upper and lower limit currents to the fuel injection control IC 25.

Note that the present invention is not limited to the above-described embodiments, and includes various modifications. For example, the above-described embodiments have been described in detail for easy understanding of the present invention, and are not necessarily limited to those having all the described configurations. Further, a part of a configuration of a certain embodiment can be replaced with a configuration of another embodiment, and the configuration of another embodiment can be added to the configuration of the certain embodiment. Furthermore, it is possible to add, delete, or replace another configuration for a part of the configuration of each embodiment.

REFERENCE SIGNS LIST 1 booster circuit
3 boost driver
5 boost controller
6 resistor
7 reactor
8 output line
9 diode
15 current monitor
20 voltage monitor
25 fuel injection control IC
30 arithmetic device
35 boost setting controller
40 current table selector
45 current table
50 fuel injection circuit
55 fuel injection valve control device (electronic control device)
56 fuel injection valve (injector: INJ)
60 boost voltage monitor
70 smoothing capacitor (electrolytic capacitor)
$I_{UL1}$, $I_{UL2}$ upper and lower current setting values.

The invention claimed is:

1. An electronic control device comprising;
a booster circuit;
a boost setting controller that holds boost control information of the booster circuit;
a boost controller that controls an energizing current of the booster circuit based on a current setting value from the boost setting controller; and
a fuel injection circuit that supplies current to a fuel injection valve using voltage generated by the booster circuit, wherein
the boost setting controller reduces a boost speed of the booster circuit when information on engine temperature is higher than a predetermined value.

2. The electronic control device according to claim 1, which controls multi-stage injection of continuously injecting a specific fuel injection valve within a certain period of time using the voltage generated by the booster circuit.

3. The electronic control device according to claim 2, which reduces the boost speed by the booster circuit when a number of multi-stage injections is small.

4. The electronic control device according to claim 1, wherein the information on the engine temperature is engine cooling water temperature information.

5. The electronic control device according to claim 2, which selects a specific boost control current value from a preset current table when the information on the engine temperature is equal 1 to or more than a predetermined threshold.

6. The electronic control device according to claim 5, wherein the boost control current value is lower than a boost control current value selected under a condition other than the information on the engine temperature.

7. The electronic control device according to claim 5, wherein the current table includes a plurality of boost control current values according to the information on the engine temperature and a plurality of boost control current values according to a number of multi-stage injection stages of the fuel injection valve.

8. The electronic control device according to claim 5, wherein the boost control current value is set except at a time of fuel injection command, and the boost control current value set is reflected in the current setting value except during fuel injection.

9. The electronic control device according to claim 8, wherein the boost control current value is reflected in the current setting value except during boost operation.

10. The electronic control device according to claim 1, wherein the booster circuit includes an electrolytic capacitor as a component part.

11. A method for controlling an electronic control device, the method comprising:
- a step (a) of detecting information on engine temperature and a multi-stage injection command;
- a step (b) of comparing the information on the engine temperature detected in the step (a) with a predetermined threshold and selecting a boost control current value from a preset current table based on a result of the comparison;
- a step (c) of detecting an engine rotation signal;
- a step (d) of determining whether a fuel injection valve is not driven; and
- a step (e) of setting a current setting value and starting boost control by a booster circuit based on the current setting value set when it is determined in the step (d) that the fuel injection valve is not driven.

12. The method for controlling the electronic control device according to claim 11, the method comprising reducing a boost speed of the booster circuit when the information on the engine temperature is higher than a predetermined value.

13. The method for controlling the electronic control device according to claim 11, the method comprising controlling multi-stage injection of continuously injecting a specific fuel injection valve within a certain period of time using voltage generated by the booster circuit.

14. The method for controlling the electronic control device according to claim 13, the method comprising reducing a boost speed by the booster circuit when a number of multi-stage injections is small.

15. The method for controlling the electronic control device according to claim 11, wherein the information on the engine temperature is engine cooling water temperature information.

* * * * *